United States Patent [19]

States

[11] Patent Number: 5,577,329
[45] Date of Patent: Nov. 26, 1996

[54] TAPE MEASURE PENCIL HOLDER

[76] Inventor: Eric States, 3146 Calle Mariposa, Santa Barbara, Calif. 93105

[21] Appl. No.: 406,684

[22] Filed: Mar. 20, 1995

Related U.S. Application Data

[63] Continuation-in-part of Ser. No. 197,806, Feb. 17, 1994, abandoned.

[51] Int. Cl.⁶ ................................................. G01B 3/10
[52] U.S. Cl. ................................................. 33/768; 33/668
[58] Field of Search .......................... 33/759, 760, 761, 33/768, 769, 770, 668

[56] References Cited

U.S. PATENT DOCUMENTS

| | | | |
|---|---|---|---|
| 2,807,886 | 10/1957 | Aciego | 33/761 |
| 3,148,455 | 9/1964 | Aciego | 33/760 |
| 3,336,678 | 8/1967 | Chamberlain et al. | 33/761 |
| 4,015,337 | 4/1977 | Taylor | 33/668 |
| 4,760,648 | 8/1988 | Doak et al. | 33/761 |
| 5,172,486 | 12/1992 | Waldherr | 33/770 |

*Primary Examiner*—G. Bradley Bennett
*Attorney, Agent, or Firm*—Marvin E. Jacobs

[57] ABSTRACT

An improved attaching device for releasably attaching a marking device to a tape measure having a tape measure housing containing a measuring tape, said attaching device comprising a marker retaining arm pivotally mounted on said device and movable between a marking position engageable with a surface to be marked adjacent said measuring tape and a storage position located in a position which is compatible with insertion of said housing into a workbelt pocket.

13 Claims, 2 Drawing Sheets

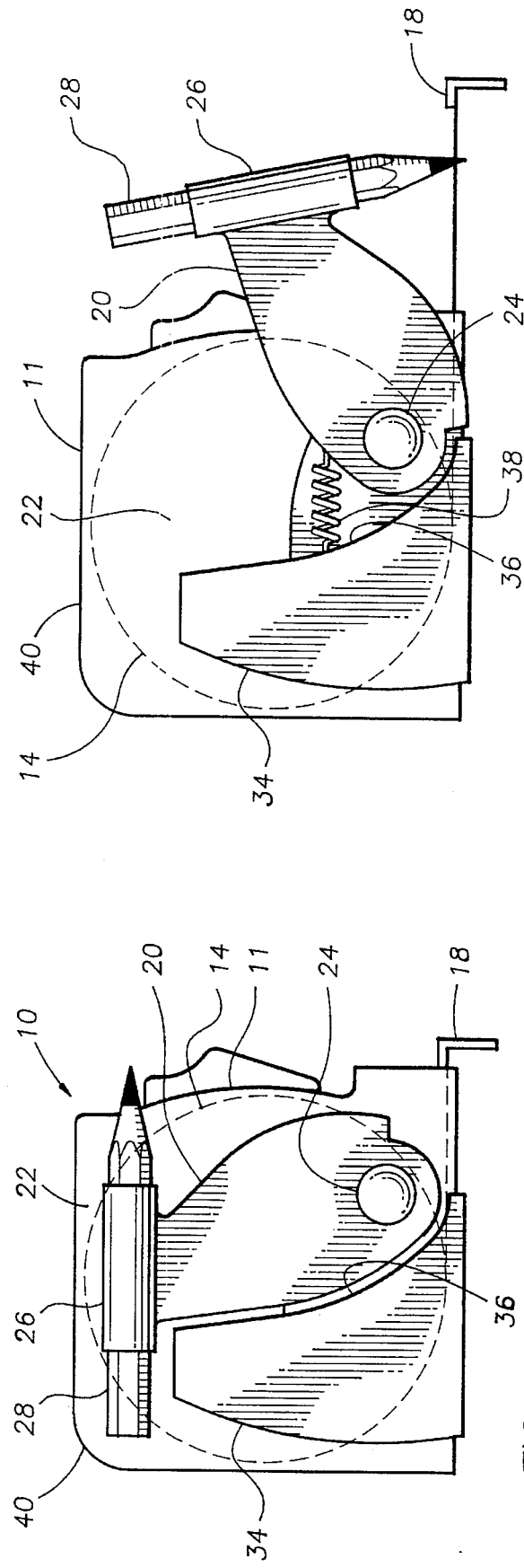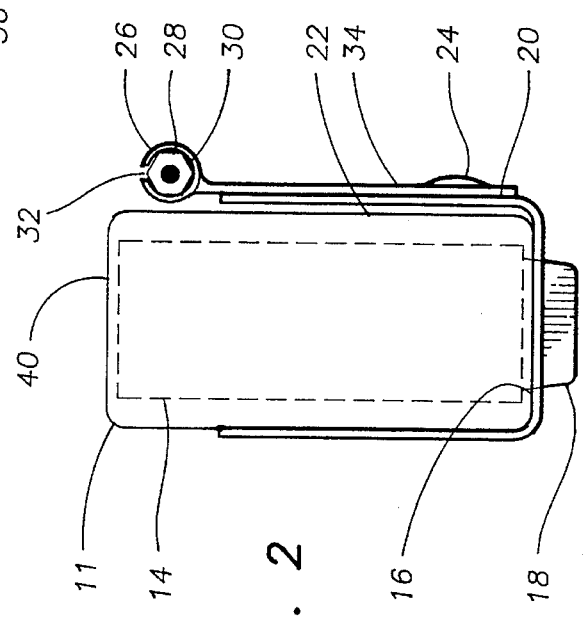

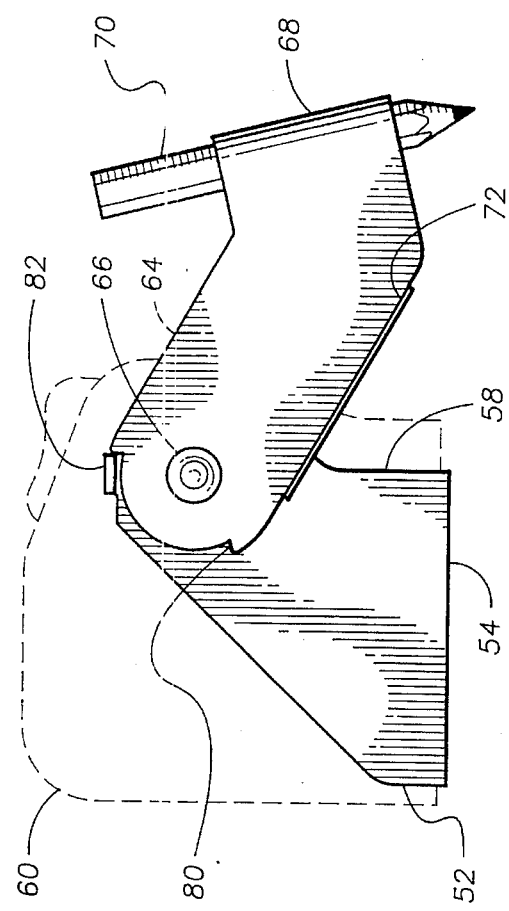
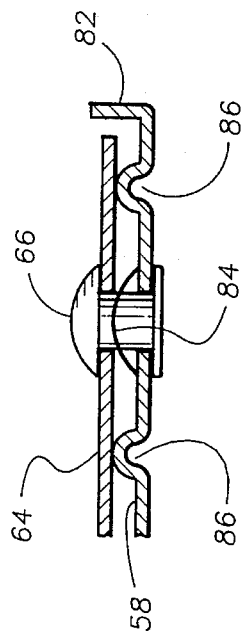
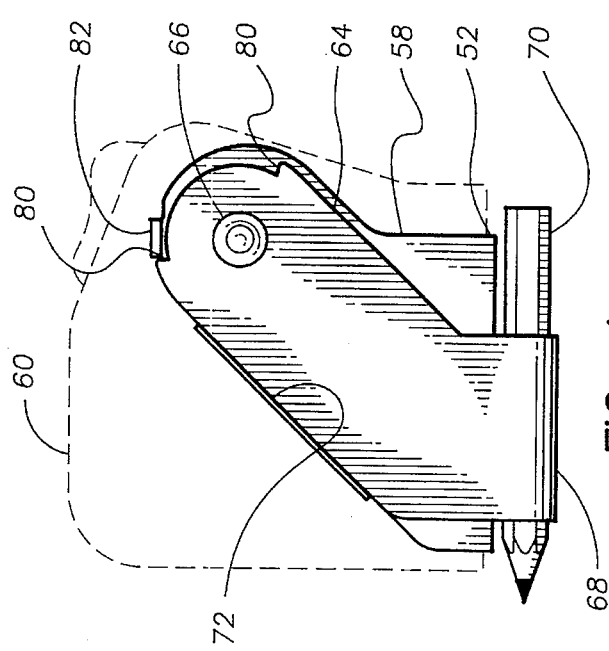
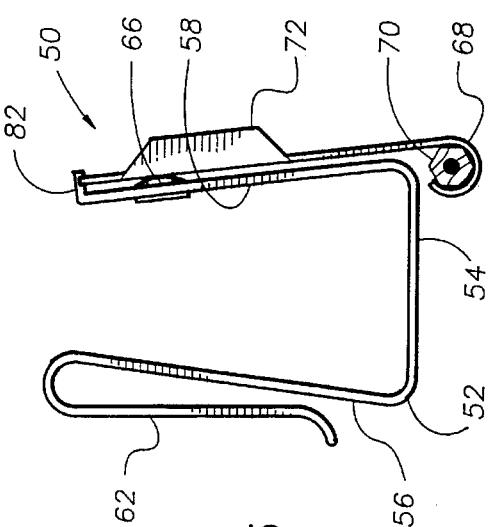

TAPE MEASURE PENCIL HOLDER

RELATED CASES

This application is a Continuation-In-Part of my patent application, Ser. No. 08/197,806, filed Feb. 17, 1994 AND NOW ABANDONED.

FIELD OF INVENTION

This invention relates to tape measures and is particularly directed to improved means for attaching a pencil to a tape measure to facilitate marking a desired measurement.

PRIOR ART

As is well known, it is common practice, when making measurements of any kind, to stretch a tape measure to the desired distance and to make a mark on the article or material being measured to indicate the desired distance. However, one hand is needed to hold the end of the tape, a second hand is needed to draw out the tape to the desired distance and a third hand is needed to make the mark. Unfortunately, most humans are limited to only two hands and, consequently, find performing this simple measuring task to be quite annoying. Furthermore, marking devices, such as pencils, are generally separate from tape measures and must be carried in a pocket or behind an ear. For use, the marking device must be removed from such a storage location to mark a desired measurement and must be returned to the storage location until needed to make a subsequent mark. However, in practice, it is not uncommon for the marking device to be misplaced, with the result that the user finds himself desiring to mark a measurement and having no means for doing so. This can make it necessary for the workman to abandon the measurement, locate a marking device, remeasure the desired distance and, then, make the desired distance mark. This wastes time and can cause additional aggravation for the workman. To overcome these problems, a second workman is often used to hold the tape, while the first workman marks the desired distance. Thus, one workman is responsible for making the measurement, while the second is responsible for keeping track of the marking device and making the desired marks. However, this is wasteful of manpower and significantly increases the cost of the measuring operation. Numerous devices have also been proposed for overcoming these problems by attaching a marking device to the tape measure. However, many of the prior art attaching devices have been complex and expensive to produce. Other prior art devices have attached a marking device to a tape measure for storage, but have required that the marking device be removed and used independently of the tape measure, which still provides the opportunity for misplacement of the marking device. Furthermore, many of the prior art devices for attaching a marking device to a tape measure have interfered with or prevented insertion of the tape measure into a workbelt pocket or the like and, hence, have significantly reduced the utility and convenience of the tape measure. Thus, none of the prior art marker attaching devices have been entirely satisfactory.

BRIEF SUMMARY AND OBJECTS OF INVENTION

These disadvantages of the prior art are overcome with the present invention and an improved marker attaching device is provided which is simple in construction, economical to produce and purchase and does not interfere with or prevent insertion of the tape measure into a workbelt pocket or the like, yet assures that the marking device will always be available for use and cannot be misplaced between measurements.

These advantages of the present invention are preferably attained by providing an improved attaching device for releasably attaching a marking device to a tape measure having a tape measure housing containing a measuring tape, said attaching device comprising a marker retaining arm pivotally mounted on said device and movable between a marking position engageable with a surface to be marked adjacent said measuring tape and a storage position located in a position which is compatible with insertion of said housing into a workbelt pocket.

Accordingly, it is an object of the present invention to provide an improved tape measure.

Another object of the present invention is to provide improved means for attaching a marking device to a tape measure.

An additional object of the present invention is to provide improved means for attaching a marking device to a tape measure which is simple in construction.

A further object of the present invention is to provide an improved means for attaching a marking device to a tape measure which is economical to produce and purchase.

Another object of the present invention is to provide an improved means for attaching a marking device to a tape measure which assures that the marking device will always be available for use and cannot be misplaced between measurements.

An additional object of the present invention is to provide an improved means for attaching a marking device to a tape measure which does not interfere with or prevent insertion of the tape measure into a workbelt pocket or the like.

A specific object of the present invention is to provide an improved attaching device for releasably attaching a marking device to a tape measure having a tape measure housing containing a measuring tape, said attaching device comprising a marker retaining arm pivotally mounted on said device and movable between a marking position engageable with a surface to be marked adjacent said measuring tape and a storage position located in a position which is compatible with insertion of said housing into a workbelt pocket.

These and other objects and features of the present invention will be apparent form the following detailed description, taken with reference to the figures of the accompanying drawing.

BRIEF DESCRIPTION OF THE DRAWING

FIG. 1 is a side view of a tape measure having a marker retaining device embodying the present invention;

FIG. 2 is an end view of the tape measure of FIG. 1;

FIG. 3 is a side view of the tape measure of FIG. 1, showing the marker retaining arm in the marking position;

FIG. 4 is a side view of an alternative form of the marker retaining device of FIG. 1;

FIG. 5 is an end view of the marker retaining device of FIG. 4;

FIG. 6 is a side view of the marker retaining device of FIG. 4, shown with the marker retaining arm in the marking position; and FIG. 7 is an enlarged detail view showing the attachment of the arm to the clip of the marker retaining device of FIG. 4.

DETAILED DESCRIPTION OF THE INVENTION

In that form of the present invention chosen for purposes of illustration in the drawing, FIGS. 1 and 2 show a tape measure, indicated generally at 10, having a generally box-like housing 11. A clip 12, releaseably attachable to a measuring tape housing 11 which contains a roll of tape, indicated in dotted lines at 14. The housing 11 has an opening 16 to allow end portion 18 of the tape 14 to be withdrawn for making measurements. The clip 12 is dimensioned to fit easily into a conventional workbelt pocket. An arm 20 is pivotally mounted on one side 22 of the clip 12, as seen at 24, and the free end 26 is formed to releasably retain a marking device, such as pencil 28. As shown, end 26 of arm 20 is formed of resilient material with an opening 30 extending therethrough of slightly less diameter than that of the pencil 28 and end 26 is split, as seen at 32, to allow flexing of the adjacent portions of end 26 to frictionally retain the pencil 28. Clip 12 has a shoulder 34 projecting outward from side 22 with a surface 36 formed to mate with the arm 20 and resilient means, such as spring 38 is connected between surface 36 and the arm 20, as best seen in FIG. 3. Spring 38 normally urges the arm 20 into engagement with surface 36 of shoulder 34 with end 26 supporting the marking device 28 substantially parallel with the top surface 40 of the housing 11, as seen in FIGS. 1 and 2. To mark a desired measurement, the workman unreels end portion 18 of the tape 14 from opening 16 of housing 11 to the desired length and, then swings arm 20 downward to the position seen in FIG. 3. Because arm 20 is mounted on side 22 of the housing 11, arm 20 will position the marking device 28 to make a mark adjacent end portion 18 of the measuring tape 14 at the desired position.

In use, the workman can conveniently carry the tape measure 10 in a pocket of his workbelt pocket, since arm 20 normally positions the marking device 28 generally parallel to top surface 40 of the housing 11. Consequently, marker 28 will not interfere with movement of the tape measure 10 into or out of the workbelt pocket. To make a measurement, the workman unreels end portion 18 of the tape 14 from opening 16 of housing 11 to the desired length and, then. swings arm 20 downward to the position seen in FIG. 3. Because arm 20 is mounted adjacent the side 22 of the housing 11, arm 20 will position the marking device 28 to make a mark adjacent end portion 18 of the measuring tape 14 at the desired position. After marking the desired measurement, the workman releases arm 20, allowing spring 38 to return arm 20 and marking device 28 to the storage position, as seen in FIGS. 1 and 2.

FIGS. 4–7 show an alternative form of the marker retaining means of the present invention, indicated generally at 40. The marker retaining means 50 comprises a generally U-shaped clip 52 formed of resilient material, such as spring steel, and having a base 54 and sides 56 and 58 projecting upward and inwardly from respective sides of the base 52 to resiliently retain a tape measure inserted between the sides 56 and 58, as indicated in dotted lines at 60. Side 56 of the clip 52 is recurved, as seen at 62 to facilitate attachment of the clip 52, and hence the tape measure 60, to the workman's belt or the like. An arm 64 is pivotally attached to side 58 of clip 52, as seen at 66, and end 68 of arm 64 is partially looped to releasably retain a marking device, such as pencil 70. A finger tab 72 may be provided projecting perpendicular to the arm 64 to facilitate actuation of the arm 64 by pressing the user's finger against tab 72. The rear end of the arm 64 is formed with a pair of recesses 80 and a stud 82 is provided on side 58 of the clip 52 projecting outwardly from the side 58 and engageable with the recesses 80 to limit the movement of the arm 64, as seen in FIGS. 4 and 6. Also, if desired, a resilient member 84, such as a wave washer, may be interposed between side 58 af the clip 52 and arm 64, encircling the pivot pin 66, and one or more dimples may be provided, as seen at 86, in side 58. The resilient member 84 cooperates with the dimples 86 to ensure parallelism of arm 64 with respect to side 58 of the clip 52.

In use, the workman inserts a tape measure 60 between sides 56 and 58 of clip 52 to allow clip 52 to releasably retain the tape measure 60. Thus, the workman can conveniently carry the tape measure 60 by clipping recurved portion 62 of side 56 of clip 52 onto his belt or the like. To make a measurement, the workman removes clip 52 from his belt and unreels the tape from the tape measure 60 to the desired length. He then swings arm 64 to place the marking device 70 in a position adjacent the tape extending from tape measure 60 and marks the desired measurement. Thereafter, the workman swings arm 64 to return the marking device 70 to the storage position, lying substantially parallel to base 54 of clip 52. The recesses 80 cooperate with stud 82 to limit movement of the arm 64. Also, resilient member 84 and dimples 86 ensure that the arm 64 moves in a plane parallel to side 58 of the clip 52.

Obviously, numerous other variations and modifications can be made without departing from the scope of the present invention. Therefore, it should be clearly understood that the forms of the present invention described above and shown in the figures of the accompanying drawing are illustrative only and are not intended to limit the scope of the present invention.

What is claimed is:

1. An Attaching device for releaseably attaching a marking device to a tape measure housing containing a measuring tape, said attaching device comprising:

a marker retaining arm pivotally mounted on said attaching device and movable between a marking position engageable with a surface to be marked adjacent said measuring tape and storage position, said arm being formed with means for releaseably retaining a marking device and at least one recess being formed in said arm; and a stud projecting outwardly from said attaching device cooperating with said recess to limit movement of said arm.

2. The attaching device of claim 1 wherein:

said marker retaining arm is mounted directly on said device.

3. The attaching device of claim 2 wherein: said tape measure housing has a top surface and said storage position of said marker is substantially parallel to the top surface of said housing.

4. The attaching device of claim 2 further comprising:

a shoulder projecting from one side of said attaching device having a surface engageable with said arm.

5. The attaching device of claim 1 further comprising:

resilient means normally urging said arm to said storage position.

6. The attaching device of claim 1 further comprising:

a generally U-shaped clip having a base and sides extending upward from said base to resiliently retain said attaching device on said housing, said arm being mounted on one side of said clip.

7. The attaching device of claim 6 wherein:

the other side of said clip is recurved to facilitate releasable attachment of the attaching device to a belt.

8. The attaching device of claim 6 wherein:

said storage position of said marker is substantially parallel to said base.

9. The attaching device of claim 1 further comprising:

a finger tab projecting perpendicularly from said arm to facilitate actuation of said arm by a user's finger.

10. An attaching device for releaseably attaching a marking device to a tape measure housing containing a measuring tape, said attaching device comprising:

a marker retaining arm pivotally mounted on said attaching device and moveable between a marking position engageable with a surface to be marked adjacent said measuring tape and a storage position and said arm being formed with means for releaseably retaining a marking device;

at least one dimple formed in said attaching device; and resilient means interposed between said arm and said attaching device to ensure parallel movement of said arm with respect to said attaching device.

11. A marking device for sliding attachment to a tape measure housing having a rectangular cross-section, a bottom wall, a pair of side walls, and a front wall which has a slot through which a length of measuring tape extends, said marking device comprising:

a U-shaped support comprising a bottom wall, a first upstanding side wall and a second upstanding side wall, said support being slidingly received on said walls of the tape measure housing with the bottom wall thereof engaging the bottom wall of the support;

said first upstanding wall having an upper curved edge to facilitate releasable attachment to a belt; and a marker releasing arm being pivotally mounted to the said second wall on the outside surface and near to the top edge thereof and the upper edge of the arm containing a marker retaining means, said arm being pivotally movable between a marking position in which the retained marker is engageable with a surface to be marked adjacent said measuring tape and a storage position.

12. A device according to claim 11 in which said marking device retaining means comprises a sleeve formed by bending the upper edge of the arm to form a cylindrical marker receiving sleeve for releasably receiving a marking device.

13. A device according to claim 12 in which the sleeve is parallel to the bottom edge of the U-shaped support when the marking device is in a storage position.

\* \* \* \* \*